United States Patent
Bruhn et al.

[11] Patent Number: 5,386,165
[45] Date of Patent: Jan. 31, 1995

[54] ELECTRIC MOTOR, ESPECIALLY FOR A WINDSHIELD WIPING SYSTEM OF A MOTOR VEHICLE

[75] Inventors: Rainer Bruhn, Karlsruhe; Bernd Walther, Bietigheim-Bissingen, both of Germany

[73] Assignee: SWF Auto-Electric GmbH, Germany

[21] Appl. No.: 30,298

[22] PCT Filed: Jul. 3, 1992

[86] PCT No.: PCT/EP92/01511
§ 371 Date: Mar. 18, 1993
§ 102(e) Date: Mar. 18, 1993

[87] PCT Pub. No.: WO93/02499
PCT Pub. Date: Feb. 4, 1993

[30] Foreign Application Priority Data

Jul. 18, 1991 [DE] Germany ............... 4123785

[51] Int. Cl.$^6$ .................................. H02K 7/10
[52] U.S. Cl. ............................ 310/75 R; 310/75 A;
310/97; 310/98; 15/250.30; 267/155
[58] Field of Search ............. 310/75 R, 75 A, 75 D,
310/89, 90, 190, 209, 78, 92, 98, 97, 99, 100;
15/250.31, 250.34, 250.30; 267/154, 155;
384/244, 225

[56] References Cited

U.S. PATENT DOCUMENTS

| | | |
|---|---|---|
| 2,311,121 | 2/1943 | Nette et al. ............ 15/250.34 |
| 2,979,352 | 4/1961 | Anderson ........ 15/250.34 U X |
| 3,128,400 | 4/1964 | Hornschuch et al. ......... 310/100 |
| 4,227,104 | 10/1980 | Hamman . |

FOREIGN PATENT DOCUMENTS

| | | |
|---|---|---|
| 2347812 | 11/1977 | France . |
| 1455953 | 9/1969 | Germany .......... 15/250.34 |
| 2052541 | 5/1972 | Germany . |

Primary Examiner—R. Skudy
Attorney, Agent, or Firm—Robert P. Seitter; J. Gordon Lewis

[57] ABSTRACT

In order to be able to completely eliminate the axial play of an armature spindle of an electric motor, especially for a windshield wiping system of a motor vehicle, even though conditions change over time, a prestressing member acted upon by a spring leg continuously presses against the end of the armature spindle. The prestressing member does not necessarily have to abut directly on the end of the armature spindle, but rather a cap is inserted onto the end of the armature spindle and non-rotatably fixed to the motor housing or a gear housing. An eccentric formed as the housing of the prestressing member abuts on the outside of the bottom of the cap. In an alternative embodiment, a mushroom shaped prestressing member having a mushroom head presses against the end of the armature spindle. The axial feed movement results from a rotational movement caused by the spring in connection with at least one helical surface on the prestressing member which cooperates with a helical counter surface of the housing with each stroke in the turning direction.

9 Claims, 5 Drawing Sheets

ELECTRIC MOTOR, ESPECIALLY FOR A WINDSHIELD WIPING SYSTEM OF A MOTOR VEHICLE

BACKGROUND

The invention refers to an electric motor, especially to a small-size motor, adapted to drive at least one wiper arm of a windshield wiping system of a motor vehicle, with a rotatably mounted armature spindle, wherein one of the spindle ends is axially acted upon by means of a spring loaded prestressing member. The spring has the form of a spring winding with one spring leg retained by a housing, while the other spring leg is connected with the prestressing member which is rotatably mounted in this housing.

An electric motor of this type is known from the German specification DE-OS 20 52 541 which provides a prestressing member having an adjusting screw, the inner end of which abuts directly on the driving shaft of the motor and which is loaded by means of the spring in the tightening direction. Due to the advancement of the adjusting screw, there is no axial play. Because the screw may play in the internal screw thread, an impeded motion results which can be compensated only by a strong spring.

SUMMARY OF THE INVENTION

Consequently, the object of the invention is to improve upon an electric motor to provide relative ease of motion of the armature spindle while eliminating the axial play automatically.

In order to achieve this object, it is suggested according to the invention that the electric motor be designed with a prestressing member having an eccentric portion with an axis of rotating which runs transversely to the longitudinal axis of the armature spindle and a surface which abuts the end of the armature spindle. The design of the eccentric achieves a large axial movement by a means of a relatively small angle of rotation. Because the axial play of such an electric motor changes by relatively small amounts only, the prestressing member need not be turned considerably. The eccentricity of the eccentric is chosen in such a way that a complete self-locking device is achieved. Because the armature spindle is loaded in axial direction, the occurring friction losses have to be taken into consideration when dimensioning the spring. However, structural effort is not considerably augmented compared to the traditional construction.

A further embodiment of the invention provides that the axis of rotation of the eccentric runs vertically to the geometric axis of the armature spindle. In this way the eccentric essentially always makes contact at the area of the geometric axis of the armature spindle.

An especially preferred variation of the embodiment results from the preassembly of the spring with an integral unit including the eccentric and the pivot or axis of rotation of the eccentric, the spring being already pretensioned to the necessary extent before the assembly of the whole unit. However, as the spring tension is communicated towards the outside, this unit can be assembled especially easily and without problems. At an appropriate moment the spring or its one spring leg respectively, is released, whereby the spring power can be effective, and the eccentric is pressed against the end of the armature spindle. Of course, this moment and the local conditions have to be chosen in the way that the released spring leg does not make any uncontrolled movement.

A further embodiment of the invention provides a contact surface on the housing which allows the spring leg to be removed from its support axially to the direction of rotation of the eccentric facilitating the assembly and the release of the spring leg automatically during the assembly at the right moment. The spring leg, preferably protruding from the eccentric in the radial direction, is moved to abut on the contact surface disposed in its range of motion during the assembly operation of the unit. The relative movement of the unit towards the one captive spring leg which now is inevitable to occur, effects the release of the spring leg from its support edge or surface. If the assembly of this unit is performed while the cover is put on, the cover prevents the released spring leg, which is under corresponding tension, from making an uncontrolled movement, for example out of the housing.

In order to retain both spring legs before the assembly of the unit consisting of the eccentric, prestressing member and spring, it is especially advantageous, that the prestressed member is provided with an axial stud having a groove forming a support area for the two sprig ends. It can be seen from the FIG. 12, that each spring leg grips behind an inwardly extending jut, which is provided at the free end of each groove wall, both juts being directed opposite each other.

The construction becomes especially simple in a very advantageous way, in that the pivot of the eccentric is integrally formed with the housing of the motor or with a gearing driven by said motor, for example, aluminum diecasting or the like may be chosen as material.

In a further embodiment of the invention, the prestressing member is retained by a safety element, for example a so-called clamping cam connected to the eccentric at least on one side. This clamping cam is simply slipped over the stud, preferably reduced in cross-section, until it abuts on the front surface of the eccentric. In the alternative, the eccentric can also bear against a wall of the housing, then and an axially protruding support member in the form of an eccentrically arranged support stud with a crowned end is usefully provided.

An especially preferred embodiment of the invention is characterized in that a cap which is non-rotatably retained in the housing is slipped onto the free crowned end of the armature spindle and in that the eccentric bears against the outer surface of the bottom of the cap. In this case, the eccentric does not press directly against the armature spindle, but indirectly via the intermediary of the cap bottom. As the bottom of the cap is a plane and the armature spindle is crowned at its abutting end, shifting of the center is avoided, even if the eccentric makes contact with the cap outside the geometric center of the bottom of the cap. The cap is usefully made of plastic material. Material of this kind can also be used for the prestressing member.

A further solution of the object results from an electric motor having a spring loaded prestressing member axially acting upon one end of the armature spindle with the first end of the spring retained in the motor housing and the second end connected to the prestressing member which is rotatably and axially movably mounted in the housing, the prestressing member having helical surfaces which cooperate with helical counter surfaces in the motor housing. This electric motor is very compact and robust and generally avoids the shifting of the center and furthermore can be developed in such a way that automatic assembly is possible. This design is also suitable for a pre-assembly of the bearing area in sections.

The helical surface and the helical counter surface at first engage in circumferential direction over a large area. As the axial play of the bearing shaft increases, the helical surface or each helical surface climbs up along its helical counter surface, which leads to an axial displacement of the prestressing member towards the spindle end. It is possible to provide the helical surface and the helical counter surface with the same relatively high helical pitch, so that only a small rotation angle is necessary for an axial displacement. For this reason the spring will release itself only insignificantly, so that substantially the complete spring power for eliminating the axial play is always available within the usual area. On the other hand, the pitch may only be of such an amount as to always ensure a complete self-locking.

A further embodiment of the invention results from shaping the prestressing member like a mushroom which provides various advantages such as the safe placement of the spring and simple prestressing and assembling. Softer material is chosen for the prestressing member than for the armature spindle, so that the armature spindle can adjust itself to the prestressing member over time. However, the prestressing member is automatically re-adjusted by the necessary amount.

An advantageous variation results from the prestressing member bearing a radially protruding barb connected to a spring elastically pressable tongue. This design provides ease of assembly or pre-assembly in sections without any problems. After the insertion of the spring and the prestressing member in the recess of the housing, the spring is tensioned by turning the prestressing member. The helical surface of the prestressing member moves downwardly along the helical counter surface in the housing such that the mushroom head is spaced apart from the armature spindle. When the spring is maximally tensioned, the barb emerges from the end of the bore away from the axis. Now the spring elastic force of the tongue which carries the barb is swung radially to the outside to overlap the front end surface of the housing on which it can support itself under the effect of the spring. In order to reliably avoid a turning, it is possible to fix an axially protruding stop at this outer axial front surface of the housing. On the other hand, back turning of the prestressing member is avoided merely by the engagement with the front edge.

After the assembly of the motor it is possible to move the barb in radial direction with an appropriate tool, whereby the tongue carrying the barb engages the mating recess of the shank of the prestressing member. Now the spring power rotates the prestressing member so that the mushroom head can move to bear against the crowned end of the armature spindle.

In order that the spring elastic tongue can relax its tension even in the working position of the prestressing member and can turn easily in the housing, it is suggested in a further development of the invention that the bore for the shank of the prestressing member is enlarged in a step-like fashion in the outer area, in order to receive the released barb. When the prestressing member usually performs less than one turn, it is sufficient to provide only a corresponding pocket which extends over the actual angle of rotation instead of a step-like extension of the bore extending over 360 degrees.

In order to be able to bring the prestressing member into the secured tensioned position it is very advantageous that two blind holes are provided on the mushroom head of the prestressing member preferably positioned on a common circle. This design permits the automatic assembly by means of a specialized tool, which can be applied to the prestressing member only. The helical counter surfaces are integrally formed with the housing or a housing cover in a very advantageous way by arranging them concentrically to the bore and displacing them 180° relative to each other.

An important feature of all variations is that a centric start of the spindle is always guaranteed.

DETAILED DESCRIPTION OF THE PREFERRED EMBODIMENT

The electric motor not shown in detail, is preferably a direct current small size motor, as it is used for driving at least one wiper arm of a windshield wiping system of a motor vehicle commonly known in the art. The motor does not drive the spindle carrying the wiper arm directly, but a known gearing is inserted there between. The armature spindle 1 is reduced in cross section at the end where a stud 2 with preferably a crowned or hemispherical end is formed. In such electric motors, an axial play is unavoidable and may increase in the course of time. Special pressures occur in a windshield wiping system in that the wiper shaft makes an oscillating movement. This axial play is principally undesirable and, consequently, its elimination is desirable. This axial play is found not only in new motors, but also in motors which have been running for longer periods of time, therefore a constant re-adjustment of the device for eliminating the axial play is also necessary.

Figure 1:
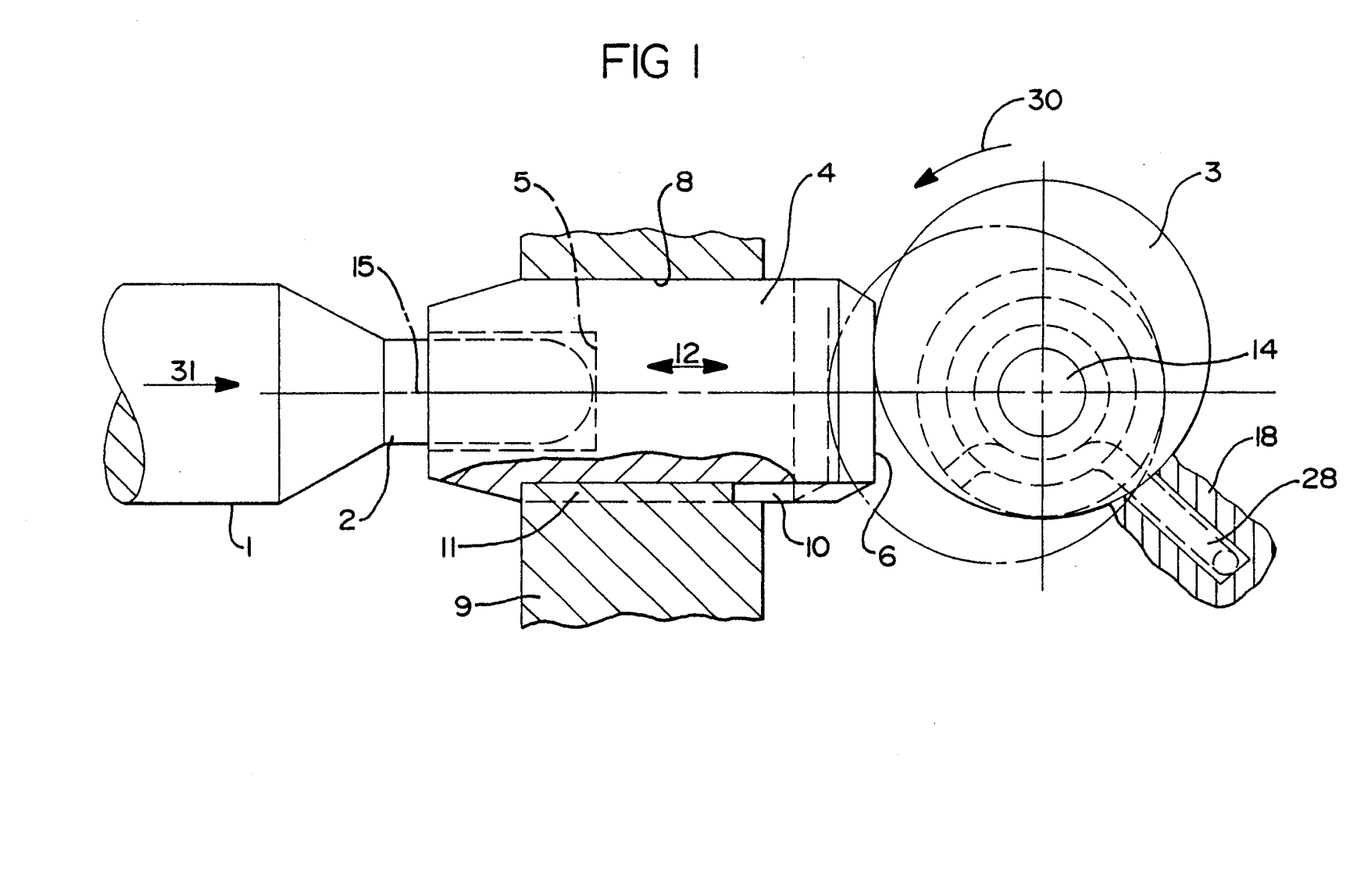
FIG. 1 is the partial side view of the armature spindle with an associated device for eliminating the axial play according to a first embodiment.
Figure 2:
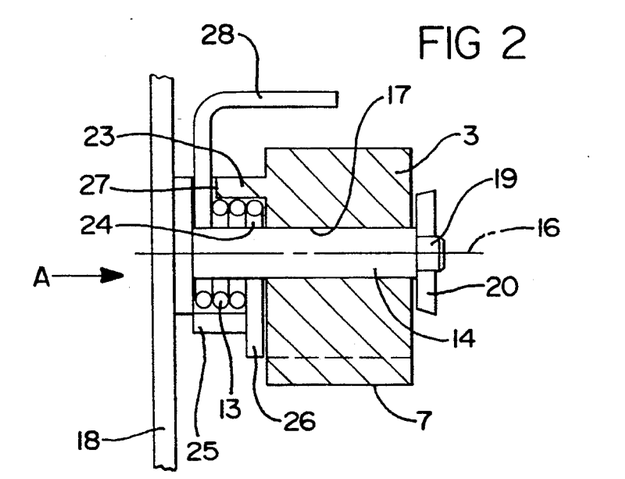
FIG. 2 is a longitudinal sectional view of the prestressing member and the tension spring of FIG. 1.

An essential element of this device is a rotatably mounted prestressing member 3, which does not directly cooperate with the end of armature spindle 1 or the stud 2 in the embodiment according to FIG. 1, but indirectly cooperates through cap 4. This cap 4 is provided with a centric pocket bore 5, at the bottom of which abuts the crowned end of the armature spindle 1. The bottom of the cap is provided with relatively thick walls. Referring to FIG. 2, the housing 7 of the prestressing member 3 is developed as an eccentric in the first embodiment which abuts on the outside 6 of cap 4. In FIG. 1, a starting position is drawn in continual lines and a working position of the prestressing member 3 as well as of the assigned cap end is drawn in broken lines. Although in the starting position and any intermediate positions between the two drawn positions, the eccentric of prestressing member 3 does not abut exactly centrically on the outside 6, shifting of the center does not result, because the crowned end of the armature spindle 1 abuts centrically on the bottom of the pocket bore 5. The cap 4 is situated in a bore 8 of a schematically indicated housing 9 in the embodiment according to FIG. 1, which may be the motor or gear housing. In order to avoid a turning of the cap 4 in this bore, it is possible, as far as the friction is not sufficient, to provide the cap 4 with a longitudinal groove 10 at the outside, into which engages a wedge 11 which is fixed to the housing. This non-rotatable connection allows the necessary axial movement in the direction of the arrow 12. The prestressing member 3 (or the eccentric) is under the constant tension of a spring, designated as spring leg 13 in all embodiments. Said spring leg 13 surrounds the axis of rotation of the eccentric 14 concentrically according to FIG. 2. According to FIG. 1, the axis of rotation of the eccentric 14 runs transversely to the geometric axis 15 (or axis of rotation) of the armature spindle 1. In this case the geometric axis 15 crosses the axis of rotation of the eccentric 14 in a preferred way. Furthermore, a bore 17 of the prestressing member 3 shares a common axis in the variation according to FIG. 2. The eccentric can be made of plastic material. In this embodiment the outside housing 7 forms a closed area without a point of discontinuity. Other cam shapes are also possible without problems.

In the embodiment according to FIG. 2 the axis of rotation of the eccentric 14 is integrally manufactured with a wall of the gear housing 18. The gear housing 18 can be of known construction, therefore a detailed presentation is not necessary. Certainly the axis of rotation of the eccentric 14 can also be manufactured separately and fastened at the wall of the housing of the gearing or possibly of the motor in a manner which is commonly known in the art. The integral production is the cheapest and therefore the most advantageous possibility, if injection spraying is used. A known safety element, for example a so-called clamping cam 20, is slipped over an end stud 19. Any other known safety element is also possible. On the other hand, such an element is not absolutely necessary, as can be seen in the embodiment according to FIG. 4. In said embodiment the prestressing member 3 carries a support member 21 at its front surface away from the spring leg 13, configured in this example as a stud with a crowned end which is formed onto said prestressing member. This stud can support itself at the inside or at a housing cover, respectively according to FIG. 4 in a manner commonly known in the art.

Figure 4:
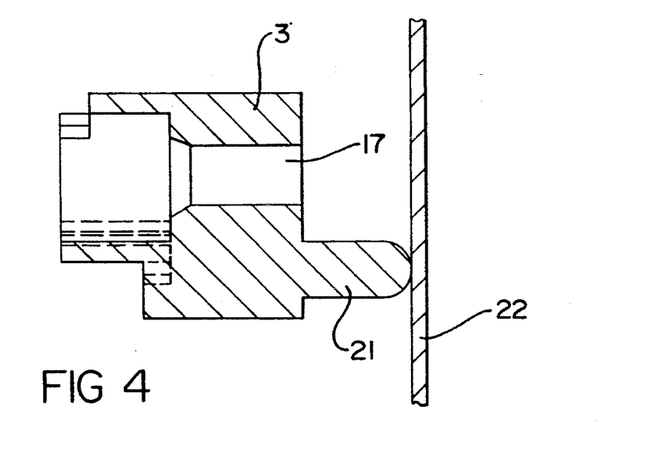
FIG. 4 is a cross-sectional view depicting a second embodiment of the prestressing member of FIG. 2.

Certainly the support 21 at a cover can also be made in a different manner, for example attached to the axis of rotation of the eccentric 14.

According to FIG. 2 the opposite end of the prestressing member 3 is supported directly or indirectly at the gear housing 18, and may be configured as a pipe-shaped connecting piece 23 whose inside wall forms an axially open ring groove 24 concentric with the axis of rotation of the eccentric 14 which accommodates the windings of the spring leg 13. The ring-groove 24 is provided with an open rim in the axial direction, so that the windings of spring leg 13 can be inserted. Furthermore, a radial slot 25 runs into ring groove 24 in order to accommodate the spring leg 26 situated at the side of the eccentric 14. Said spring leg 26 protrudes into the radial slot 25 toward the outside according to FIG. 2. A further radial slot 27 which is shorter in axial direction though, facilitates the penetration of the spring leg 28 situated at the side of the housing 7. This spring leg 28 is preferably tensioned as it engages a corresponding radial slot 29 with an open rim in the housing 18.

Figure 3:
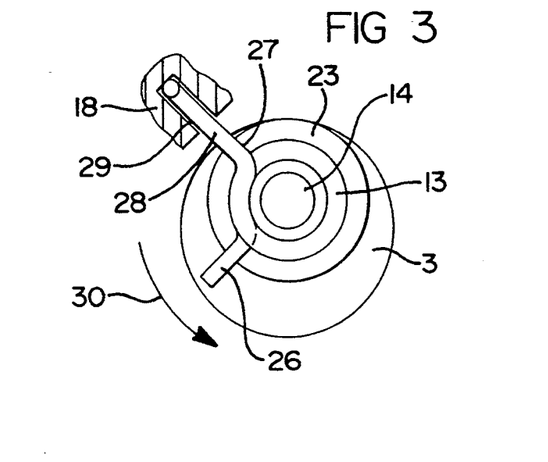
FIG. 3 is a view taken in the direction of the arrow A of FIG. 2 without the wall of the housing.

If the prestressing member 3 in FIG. 3 is turned contrary to the arrow 30, it leads to a tensioning of the spring 13. If the prestressing member 3 is released afterwards, it tends to turn back in the direction of the arrow 30. According to FIG. 1, the prestressing member can turn back only as the axial play of the armature spindle 1 allows it. The remaining spring power ensures, that the armature spindle 1 cannot be displaced, when under corresponding pressure, in the direction of the arrow 12.

Figure 5:
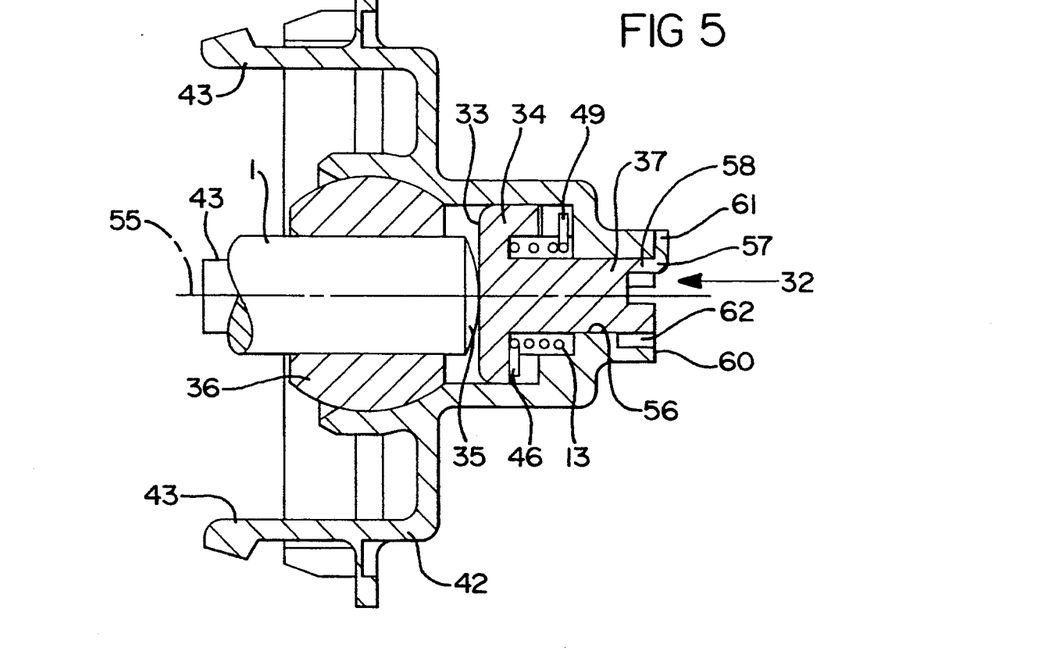
FIG. 5 is a longitudinal cross-sectional view through the cover of the motor housing showing the bearing and the device for eliminating the axial play according to a third embodiment of the invention.
Figure 6:
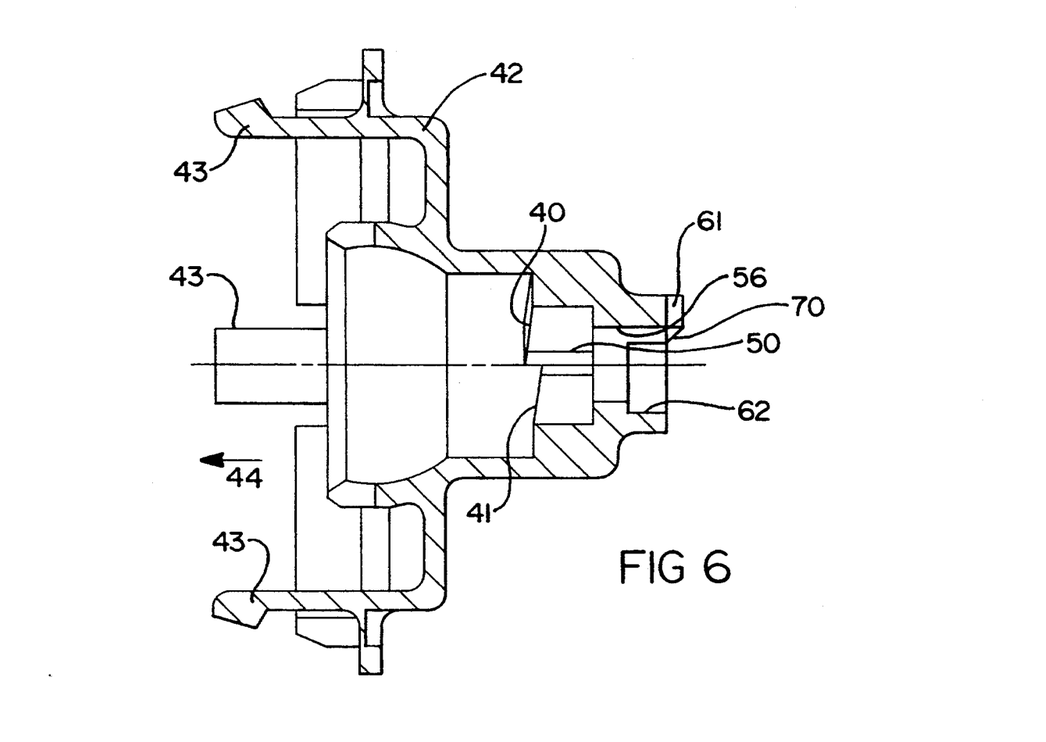
FIG. 6 is a cross-sectional view of the loose cover of the housing of FIG. 5.
Figure 7:
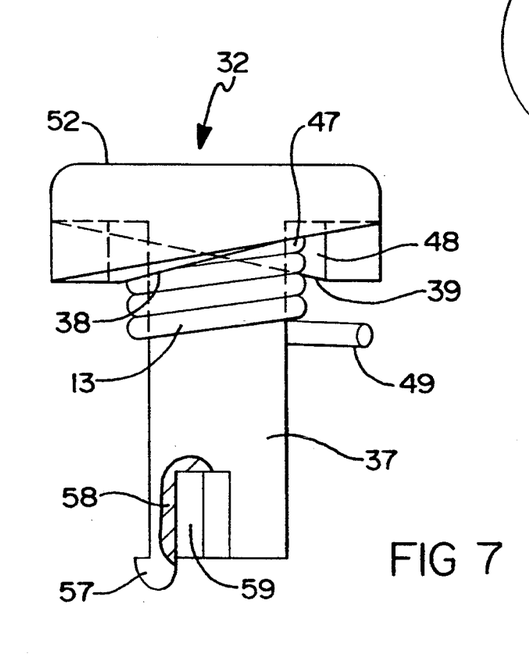
FIG. 7 is a partial cross-sectional side view of the prestressing member of FIG. 5.

The embodiment according to the FIGS. 5 to 10 uses a different prestressing member 32, which in principle has the shape of a mushroom head 34. The outside surface 33 of the mushroom head 34 abuts on the crowned end 35 of the armature spindle 1. FIG. 5 shows a section of one of the two preferrably calotte bearings 36 of the armature spindle. The windings of the spring leg 13 surround the shank 37 of the prestressing member 32 concentrically. The spring 13 again exerts a turning moment on the prestressing member 32. FIG. 6 shows cover 42 absent, spindle 1, calotte bearing 36, and prestressing member 32. As shown in FIG. 7, in connection with at least one, but in the present embodiment, two helical surfaces 38 and 39 directly joining each other but are displaced by 180 degrees, it is possible to reach the axial feed motion of the prestressing member 32 against the crowned end 35 of the armature spindle 1 from this turning moment. The helical surfaces 38 and 39 cooperate with two equal counter helical surfaces 40 and 41 of the housing, which are configured in this embodiment as helical surfaces at a cover 42 of a motor housing (motor housing not shown), lockingly connected with the open end of the motor housing by means of four locking tongues 43. The direction of rotation of the motor is chosen in such a way that the reaction force works in the sense of the arrow 44 and therefore, these locking connections are not under pressure.

Figure 8:
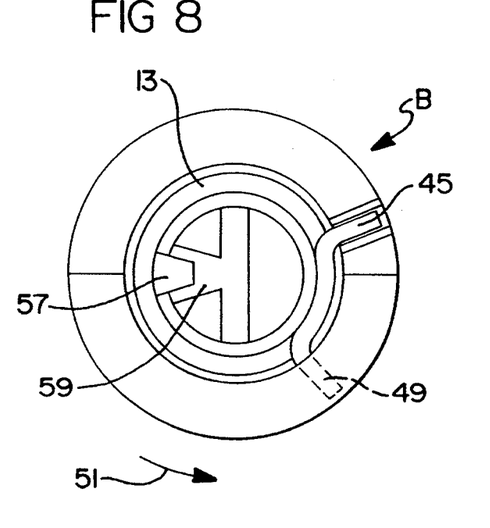
FIG. 8 is a bottom view the prestressing member of FIG. 7.
Figure 9:
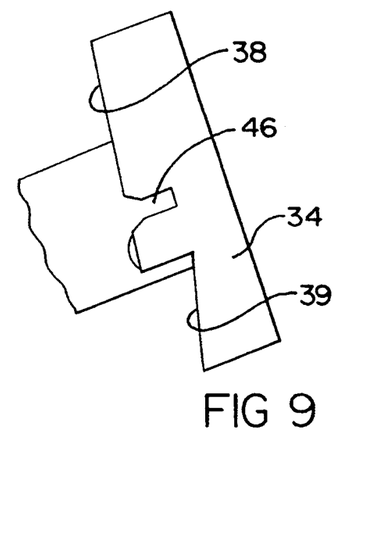
FIG. 9 is a partial view of the prestressing member of FIG. 8 in the direction of arrow B.
Figure 10:
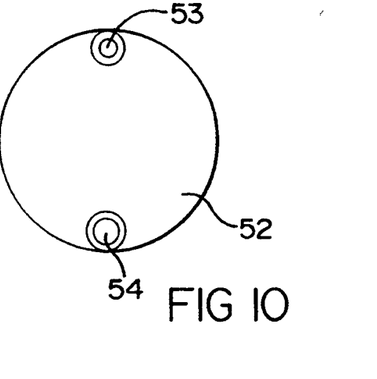
FIG. 10 is a top view of prestressing member of FIG. 7.

According to FIGS. 8 and 9, the spring leg 45 situated at the side of the prestressing member 32 engages an axial, radial recess groove 46 with an open rim at the bottom side of the mushroom head 34. FIG. 7 illustrates that the one spring end 47 is pushed into an axial ring groove 48 with an open rim at the bottom side of the mushroom head 34. The other spring leg 49 protrudes from the windings of the spring 13 to engage an axial radial slot 50 in the cover 42 of the motor housing which acts as a stop in the turning direction 51.

Referring to FIG. 8, if the prestressing member 32 is turned in the direction of the arrow 51, this leads to a tensioning of the spring 13 because the spring leg 49 is retained in the cover 42. This turn is made possible by the fact that at the outside 52 of the mushroom head 34 there are two pocket hole bores 53 and 54, preferably with various diameters, in which corresponding studs of a turning and prestressing tool can be inserted. Only as a matter of form, it is added at this point that the armature spindle 1 and the shank 37 of the prestressing member 32 are coaxially aligned with each other, and therefore have a common geometrical axis 55, as shown in FIG. 5.

The shank 37 of the prestressing member 32 is rotatably and shiftably mounted in a bore 56 in the cover 42 of the motor housing, which corresponds to its diameter. Bore 56 is also open to the outside, therefore it is developed as transition a bore. A barb 57 at the free end of the shank 37, is formed onto the free end of a pressable tongue 58 which is integrally manufactured with the shank 37. So that tongue 58 is able to deflect elastically for the removal of spring 13, the shank 37 comprises a recess slot 59as shown in FIG. 7. According to FIG. 5, the barb 57 lockingly overlaps the outer rim 60 at the front side of the bore 56. Though, this is only possible in the almost deepest insertion position of the shank 37. In this case the spring is almost maximally tense. Further, the helical surfaces 38 and 39 and the helical counter surfaces 40 and 41 overlap almost maximally. In order to avoid a back turn movement, a projection 61 is formed onto the outer rim 60, against which projection 61 the barb 57 presses under the effect of the spring 13 and which is overcome by the barbs 57 with the help of a starting slope 70 in its deepest insertion position of the shank 37, while the prestressing member 32 is screwed in.

According to FIG. 6, bore 56 is widened in a step-like fashion towards the outside for the shank 37 of the prestressing member 32. This widening 62 facilitates the turning of the barb 57, if it is not locked with the outer rim 60 at the front side, as is the case during normal operation. The locking position shown in FIG. 5 is an assembly position which facilitates the assembly of the motor.

Figure 11:
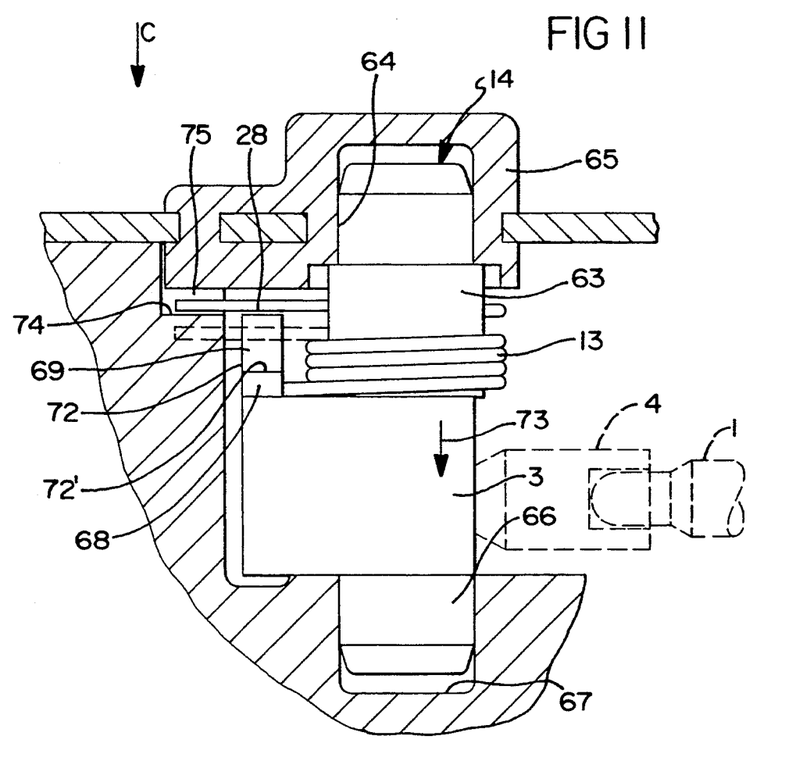
FIG. 11 is a partial cross-sectional view through the rotational axis of the eccentric portion of a fourth embodiment of the invention.
Figure 12:
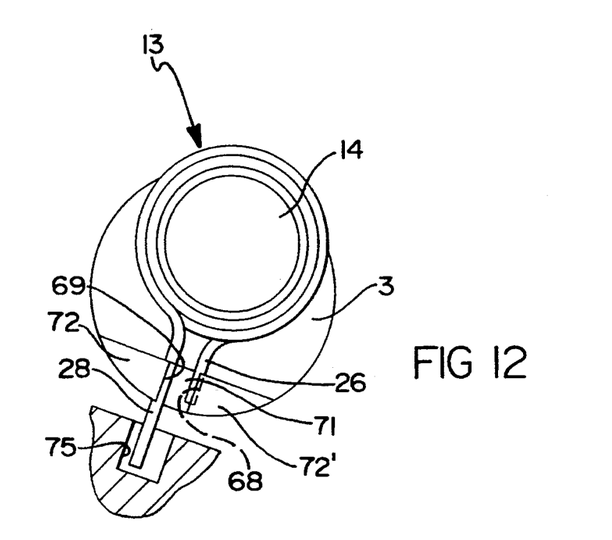
FIG. 12 is a view of the eccentric portion taken in the direction of arrow C of FIG. 11.

FIGS. 11 and 12 show an alternative embodiment similar to the embodiment depicted in FIGS. 1 to 4. In contrast to the embodiment of FIG. 1, in FIG. 11 the prestressing member 3, again developed as eccentric, is non-rotatably connected with the axis of rotation of the eccentric 14, for example integrally produced. At the same time a spring leg 13 is slipped onto the end of the eccentric 14 which can be reduced in a step-like fashion in the cross section according to FIG. 11 with the reduced part engaging a bore 64 of a cover 65. The other end 66 of the prestressing member 3 engages the bore 67 of a housing.

The spring leg 13 can be pre-assembled in a very advantageous way. Spring leg 13 comprises, similar to the embodiment depicted in FIG. 3, two spring legs 26 and 28, which run preferably parallel against each other in the pre-assembled position as shown in FIG. 12 such that the spring 13 is completely tensioned. This tension is retained by abutting the two spring legs 26 and 28 on respective support areas 68 and 69 of the prestressing member 3 which are formed by the side walls of a groove 71 with an open rim. Groove 71 is situated between projecting studs 72, 72' of the prestressing member 3. The groove 71 with an open rim is preferably narrowed at its free end pointing towards the cover 65, so that both spring legs 26 and 28 grip behind an inwardly extending out of the groove 71, which is fixed there, as can be seen from FIG. 12.

The unit is assembled in the sense of the arrow 73. According to FIG. 11, longer radial protruding spring leg 28 meets a contact surface 74 fixed at the housing during the assembly. This leg 28 reaches the contact surface 74 before the pivot or axis of rotation of the eccentric 14 reaches the end insertion position, which can be seen from FIG. 11 and which is indicated by the final and beginning continual and chain-dotted lines respectively. In the end phase of the assembly, the spring leg 28, which contacts the housing when in operation, is lifted out of the groove 71 with open rim and is thereby released to bear against the housing surface 75 under the effect of the spring tension. At the same time, the prestressing member 3 is directly or indirectly pressed against the end of the armature spindle 1 in a manner similar to that depicted in FIG. 1. The narrowing of the groove 71 is certainly chosen in such a way that a spring leg 28 at the side of the housing can pass over the small jut of the groove 71. The spring leg 26 situated at the side of the eccentric 14 remains there. This embodiment is especially easy to assemble and therefore also cost saving.

What is claimed is:

1. An electric motor, for driving at least one upper arm of a windshield wiping system of a motor vehicle, comprising:
   a rotatably mounted armature spindle having a first axis of rotation and first and second ends,
   a cap attached to said first end of said armature spindle,
   a rotatably mounted prestressing member having a second axis of rotation generally perpendicular to said first axis of rotation, and having an eccentric surface which urges against said cap along said first axis of rotation,
   a spring having first and second legs, said first leg bearing against said prestressing member and said second leg bearing against a cover associated with said motor, and
   wherein said spring urges said prestressing member to rotate about said second axis of rotation thereby causing said eccentric surface of said prestressing member to bear against said cap thereby urging said spindle along said first axis of rotation.

2. The electric motor of claim 1, wherein said spring surrounds said second axis of rotation, and said prestressing member includes first and second support surfaces for bearing against said first and second legs of said spring respectively, and for maintaining said spring in a tensioned position, wherein said tensioned position facilitates assembly.

3. The electric motor of claim 2, further including means for displacing said second leg of said spring from said second support surface.

4. The electric motor of claim 2, wherein said first and second support surfaces are respectively formed from first and second spaced apart studs attached to, and extending from said prestressing member.

5. The electric motor of claim 1, wherein said pressing member includes outwardly extending walls extending concentric to said second axis, said walls forming ring groove for accommodating said spring, and wherein, said walls include at least one radial slot therein for accommodating said first leg of said spring.

6. An electric motor for driving at least one wiper arm of a windshield wiping system of a motor vehicle, comprising:

an armature spindle having first and second ends, said armature spindle rotatably mounted in a housing for rotation about a first axis of the housing;

a prestressing member with a cam surface rotatably mounted for rotation about a second axis of the housing and a head surface for operatively engaging said first spindle end, said first axis generally parallel to said second axis;

a spring having first and second spring legs, said first spring leg being retained relative to the housing and said second spring leg being retained relative to the prestressing member, said spring exerting a turning force on the prestressing member;

wherein the cam surface translates the turning force against the first end of the spindle urging said spindle along said first axis of rotation, wherein said prestressing member includes a shank which terminates into a barbed portion, said barbed portion for engaging an edge of said housing and maintaining said prestressing member in a predetermined position to accommodate assembly, wherein said housing includes a bore having a first portion to accommodate said shank and a second enlarged portion to accommodate said barbed portion once said barbed portion is disengaged from said edge of said housing.

7. The electric motor of claim 6, wherein the prestressing member includes a mushroom-shaped head pressed against the armature spindle.

8. The electric motor of claim 7, wherein said prestressing member includes outwardly extending walls extending concentric to said second axis, said walls forming a ring groove to house said spring.

9. The electric motor of claim 6, wherein said prestressing member includes two recesses disposed in its head surface, said recesses adapted to be engaged by an assembly tool.

* * * * *